Siegfried K. Mayer
Adolph C. Ferrara
INVENTORS

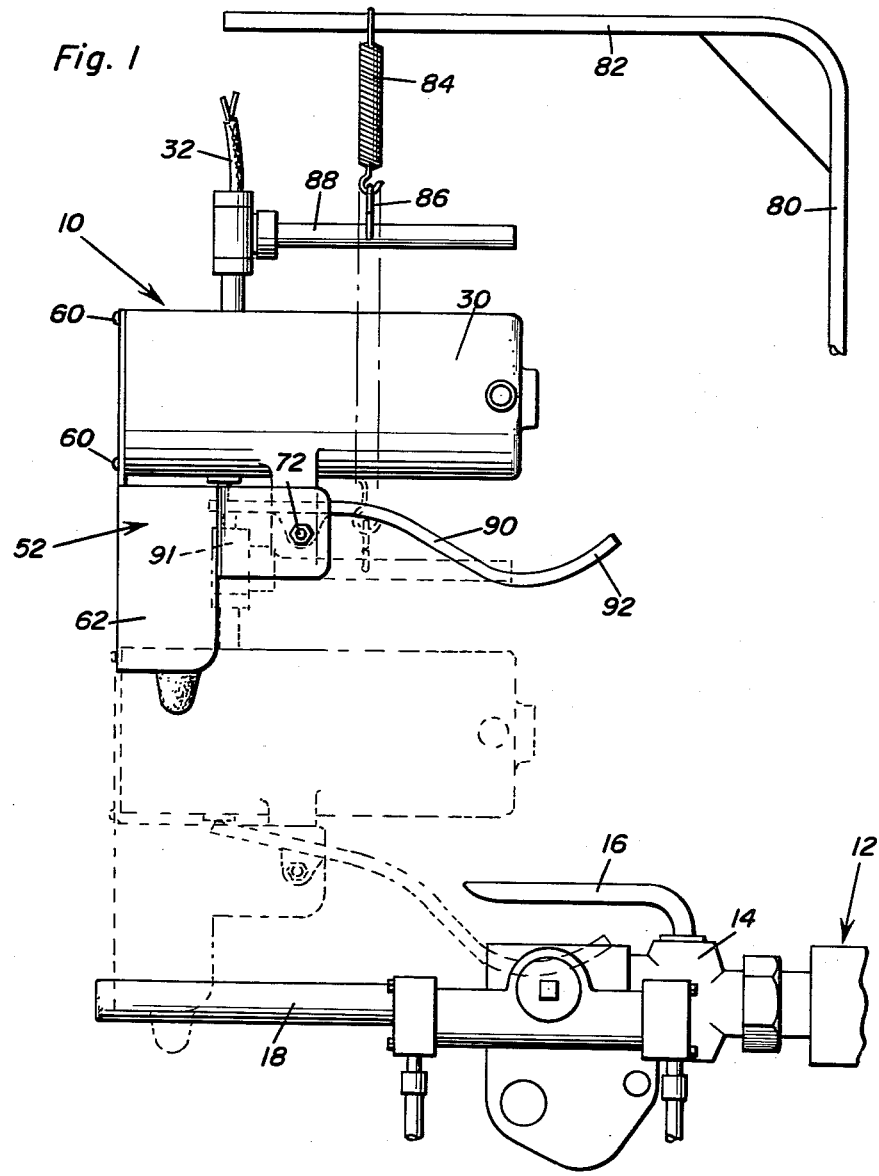

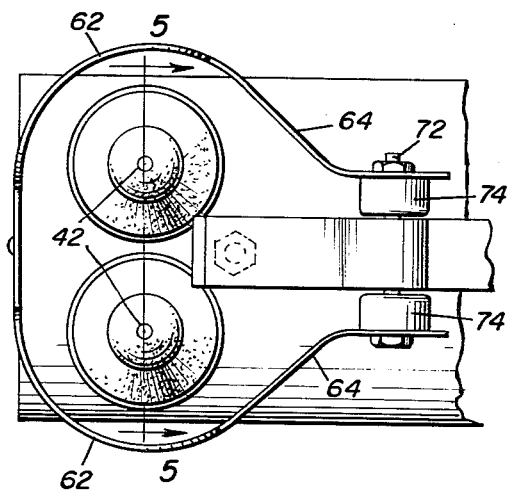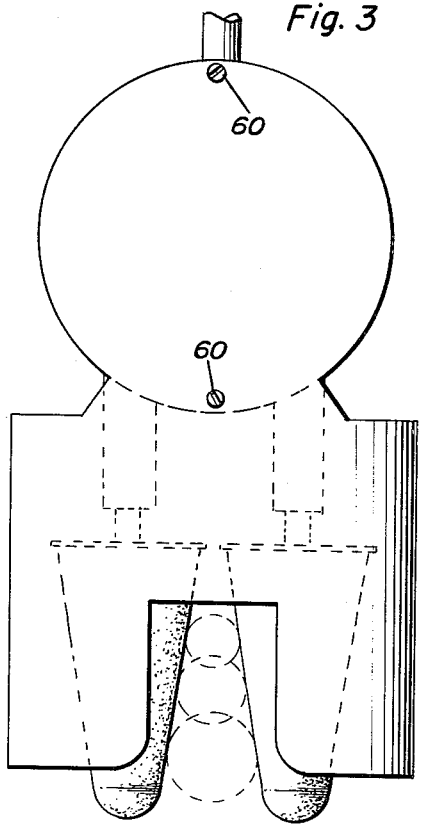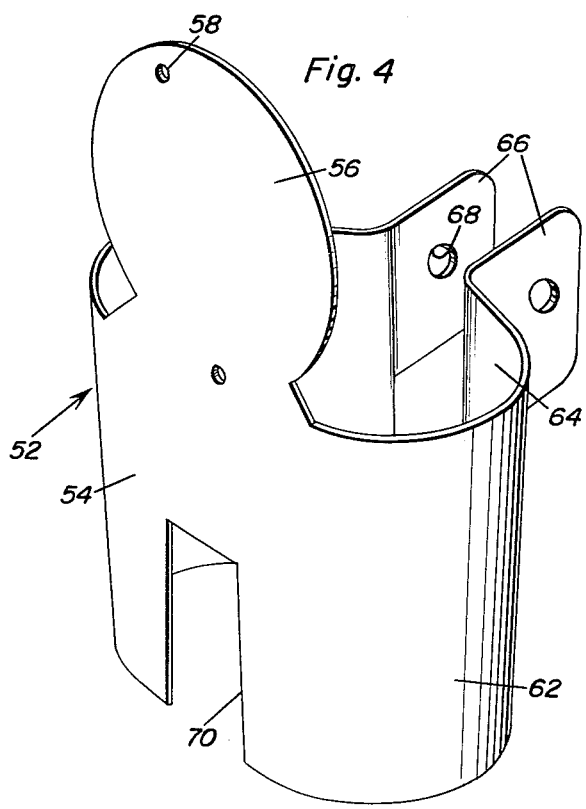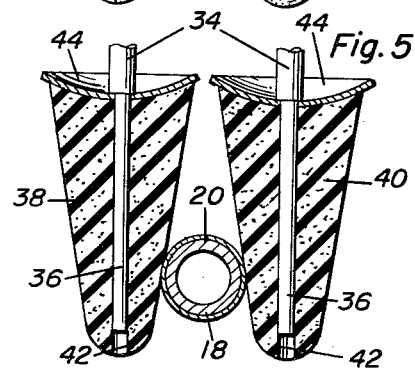
Siegfried K. Mayer
Adolph C. Ferrara
INVENTORS Aug. 21, 1962     S. K. MAYER ETAL     3,049,749
PORTABLE CASING CLEANER AND APPLIER FOR CASING STUFFERS
Filed Jan. 27, 1960     3 Sheets-Sheet 3

BY Clarence A. O'Brien
and Harvey B. Jackson
Attorneys

United States Patent Office 3,049,749
Patented Aug. 21, 1962

3,049,749
PORTABLE CASING CLEANER AND APPLIER
FOR CASING STUFFERS
Siegfried K. Mayer, 4409 Ellen St., and Adolph C.
Ferrara, 3012 Lowerline St., both of New Orleans, La.
Filed Jan. 27, 1960, Ser. No. 5,029
11 Claims. (Cl. 17—43)

This invention comprises a novel and useful portable casing cleaner and applier for casing stuffers and more particularly relates to a device to facilitate the flushing of casings and the applying of casings to the horn or nozzle of conventional casing stuffing machines.

It is now common practice in the food industry to stuff with sausage or other meat products casings of animal origin such as sheep, hog or beef casings in order to produce sausages and similar meat products. Customarily, the stuffing of the casings is effected by a power operated stuffing machine which has a discharge nozzle or horn from which the meat product is discharged, the end of the casing being embracingly engaged upon the end of the horn so that a meat product is discharged directly into the casing thereby progressively filling and stuffing the latter.

It is the present general practice in the industry to apply the casings which vary in length from 10 to 60 feet to the horn so that the entire casing except for the rearward end of the same is embracingly engaged upon the horn which is of sufficient length, as for example, about four to six inches, to receive the casing thereon. After the casing is placed upon the horn, a valve is turned and the stuffing machine is operated thereby causing the meat product to be forced from the horn into the end of the casing projecting therebeyond, this end being held closed by being squeezed shut by the hand of the operator until a small portion of the end of the casing has been filled with the meat product. Thereafter, the continued discharge of the meat product into the casing effects the filling or stuffing of the latter and progressively moves the filled casing away from the horn until the entire casing has been stuffed or filled.

The applying of the casing to the horn of the stuffer as a prerequisite for and in readiness for the operation of the stuffer in discharging the meat product into the casing for filling the same is a laborious and painstaking operation which is now performed by hand and thus requires a considerable time and the services of an employee for this purpose. Although there are some machines upon the market for the purpose of using power to draw the casing upon the horn of the stuffing machine, such devices have heretofore proved unsatisfactory for a variety of reasons, which need not be here considered in detail, to such an extent that it is now generally preferred in the industry to employ hand labor to perform this preparatory operation.

Moreover, casings are delivered to the sausage stuffing plant in a dry collapsed condition. Before the casings can be used it is necessary first to flush a cleaning fluid such as water through the casing in order to stretch and open the same to thereby facilitate its ready sliding upon the horn of the stuffing machine. The preparatory operation therefore of flushing the casing with water before it can be applied to the horn of the stuffing machine further requires the services of another employee as well as the transportation of the casings from a tank or container in which they have been soaked in water for a period of time, as overnight, in order to render the casings pliable for subsequent manipulation.

Still further, in the flushing operation as now performed in the industry, it is necessary to continually supply water to the interior of the casing from one end thereof until the stream of water has completely passed through the casing and filled the latter with water. This obviously requires a considerable amount of water which is both an undesired expense as well as being an operation in which considerable quantities of water are spilled upon the floor or the surrounding area especially where there is found to be a break in the casing itself.

It is therefore the primary purpose of this invention to greatly reduce the time and labor required to flush or clean a casing and to apply a casing to the horn of the stuffing machine.

A further object of the invention is to provide a process and a means which will greatly reduce the labor and time required and will facilitate the flushing of casings and their subsequent applications to the horn of the stuffing machine with a minimum of damage to the casings, a minimum expenditure of water or other cleaning liquid for flushing the casing and with a minimum of handling of the casing during these operations.

A still further object of the invention is to reduce the operation of flushing a casing and applying a casing upon the horn of a stuffing machine by combining and performing these steps in a single operation.

Still another object of the invention is to provide a process and a means whereby a casing may be drawn upon the horn of a stuffing machine in a smooth continuous operation with a minimum expenditure of labor by the operator of the machine and with an even force applied to the casing whereby to reduce the possibility of rupture or breakage to a minimum.

Yet another object of the invention is to provide an apparatus which shall be positioned in a manner to obtain the optimum in efficiency and a minimum requirement of labor and attention by the operator in the use of the apparatus; whereby the apparatus will be always in a position ready for use; wherein the single motion of moving the apparatus into operative position will also place the apparatus into operation and effect the drawing of the casing upon the horn of the stuffing machine.

A still further important object of the invention is to provide a machine which shall be of light weight portable character, and shall without change be capable of applying casings to the various sized interchangeable horns of stuffing machines whereby casings of different size may be applied to the horn of a stuffing machine for stuffing thereby.

Still another object of the invention is to provide an apparatus in accordance with the preceding object which shall utilize the advantages of a pair of conical rollers disposed in side by side spaced relation for frictionally gripping therebetween the horn of a stuffing machine and whereby there are applied balanced uniform forces continuously and uninterruptedly to opposite sides of the casing thereby smoothly drawing the latter upon the horn of the stuffing machine.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a somewhat fragmentary view showing the mounting of a suitable embodiment of a casing applier in accordance with this invention, the device being shown in its elevated normally idle position in full lines and being illustrated in dotted lines in its lowered operative position for drawing a casing upon the horn of a stuffing machine, a portion of the latter being shown in this figure;

FIGURE 2 is a fragmentary bottom plan view of the casing applier at the roller end thereof;

FIGURE 3 is an end elevational view of the device at the roller end thereof and showing in dotted lines the manner in which horns of different diameter are accommodated by the rollers of the device;

FIGURE 4 is a perspective view of a guard shield which partially surrounds the casing applying rollers of the device and deflects or limits the spray of liquid or solid matter from the rollers during the operation of the device;

FIGURE 5 is a view in vertical transverse section taken substantially upon the plane indicated by the section line 5—5 of FIGURE 2 and showing the construction of the resilient rollers and the manner in which they frictionally and resiliently engage a casing embracing the horn for drawing the casing upon the horn;

Figure 6:
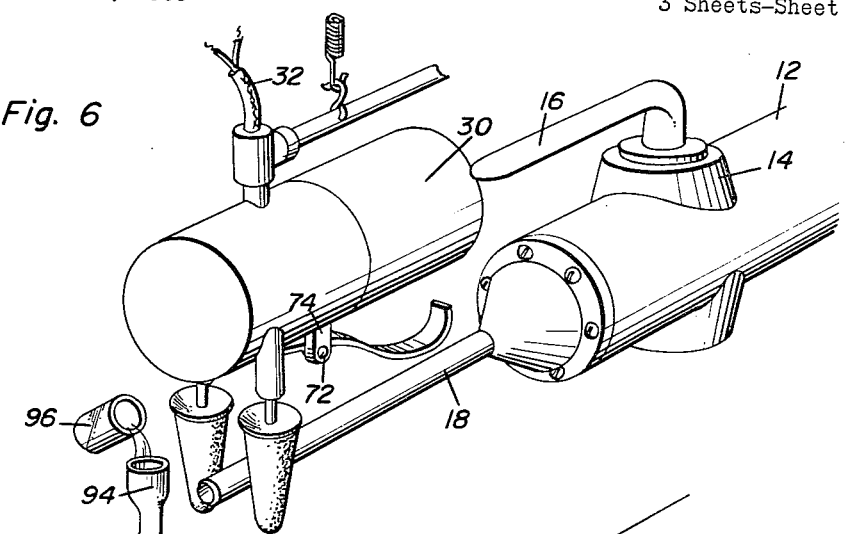
FIGURES 6–8 are perspective views showing various steps in the operation of flushing a casing and applying the same upon the horn of the stuffing machine.

In the accompanying drawings the numeral 10 designates generally the casing applier forming the subject matter of the present invention and which is adapted to be used in conjunction with the operation of a stuffing machine a portion of which is indicated generally by the numeral 12. This stuffing machine receives meat products from a suitable tank, not shown, under pressure and by means of a control valve 14 having a manually operated handle 16, permits the meat products to flow under this pressure to a discharge nozzle or horn 18. In the usual stuffing machines an interchangeable set of horns or nozzles is provided of different diameters some of which have been indicated in the dotted line showing in FIGURE 3, whereby the stuffing machine may be used to stuff casings of different diameters for various purposes.

Figure 7:
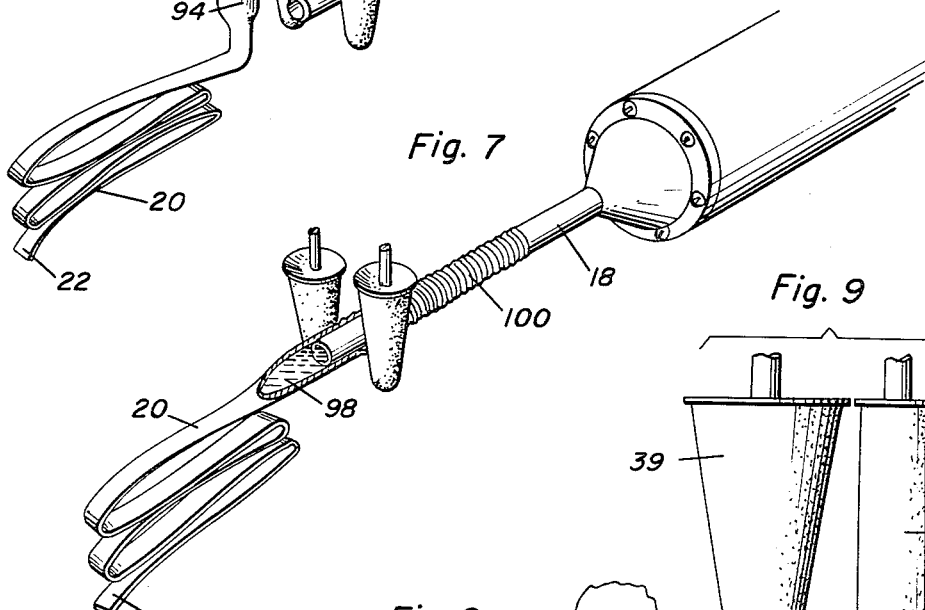
Figure 8:
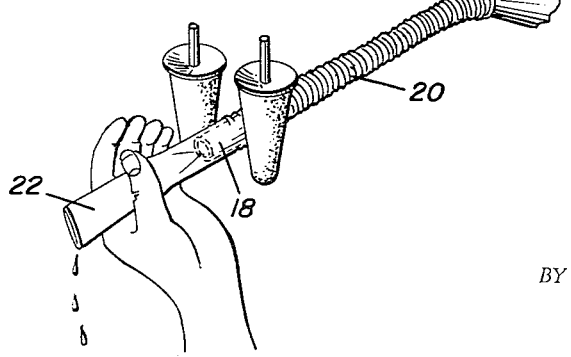

As shown in FIGURES 6–8, a casing 20 which may consist of a sheep, hog or beef casing of a selected diameter and of lengths varying between 10 and 60 feet is adapted to be embracingly applied upon the horn 18 until substantially all of the casing except the extreme rearward or outer end 22 thereof has been applied upon the horn. Thereupon by opening the valve 14 while holding the outer end 22 closed as shown in FIGURE 8, the meat product from the stuffer 12 is delivered through the horn 18 into the closed outer end of the casing 20 thereby filling the same and expelling the casing progressively from the horn as the casing is filled until the entire casing has been completely stuffed.

Once a short distance of the outer end of the casing has been stuffed, the operator then releases the casing since the frictional engagement of the meat product within the casing is sufficient to cause the casing to be continuously drawn off of the horn during the stuffing operation.

It has been heretofore a painstaking and laborious operation to separately perform the necessary steps of first flushing the casing with water to clean the interior of the casing and stretch or expand the same and second, thereafter to apply the stretched and expanded and cleansed casing to the end of the horn and to then successively push by steps the entire casing upon the horn until the casing is embracingly engaged thereon as shown in FIGURE 8 in readiness for the filling of the casing by the stuffing machine.

The portable power operated casing applier 10 of the present invention is utilized to perform simultaneously the steps of flushing the casing and applying the casing upon the horn, thereby greatly reducing the labor required and relieving the worker from the tiring and tedious operation; reducing the time required to flush the casing and the time required to then place the casing upon the horn.

For this purpose the machine 10 consists of a housing or casing 30 in which is received a conventional electric motor, not shown, and to which current is supplied as by suitable conductors 32 from any suitable source. From its forward end, the casing of the motor 30 has depending therefrom a pair of axles or shafts as at 34, see in particular in FIGURE 5, which are preferably each directly driven by the motor at the same speed but in opposite directions such that when the device is positioned as shown in FIGURE 7, rotation of the axles or shafts will serve to draw the casing 20 upon the horn 18 as set forth hereinafter.

Continuing to refer to FIGURE 5, it will be observed that the lower end of the shafts 34 have diametrically reduced end portions or spindles 36 upon which are secured fixedly for rotation therewith in any desired manner rotatable members 38 and 40 which are preferably of a resilient or deformable material such as sponge rubber or the like. Preferably, the rotatable members 38 or rollers are provided with axial bores or pasasges 42 therethrough whereby to receive the spindles 36, with the lower ends of the rollers projecting beyond the lowermost ends of the spindles so as to completely house the same, it being understood that if desired suitable closure means may be provided to close the ends of these bores.

A cup-shaped disk or plate 44 is disposed on the spindles 36 abutting against the shoulder provided between the diametrically reduced spindles 36 and the axles 34 and the members 44 overlie and overhang the upper ends of the rollers 38 and 40. This construction serves to prevent the possible dripping of lubricant upon these rollers 38 and 40 which might thereby contaminate or deleteriously affect the quality of the stuffed casing produced through the use of the casing applier and the stuffing machine.

It will be observed from FIGURE 5 that the rollers 38 and 40 are shown as of a conical configuration. Further, the axes of the spindles 36 are disposed in a generally parallel side by side relation so that the conical surfaces of the rollers 38 and 40 provide a space or throat therebetween of a varying width, this space being at its minimum at the upper end of the rollers and at its maximum at the lower end thereof. The purpose of this variable width in the throat between the rollers is to enable the same disposition of the rollers to accommodate therebetween different sizes of horns as shown by the dotted line arrangement of FIGURE 3. Thus the largest horn which can be disposed within the throat will be disposed at the bottom or open end of the same, while horns of progressively smaller diameter will be engaged by the rollers at progressively greater distances upwardly within the throat.

Figure 9:
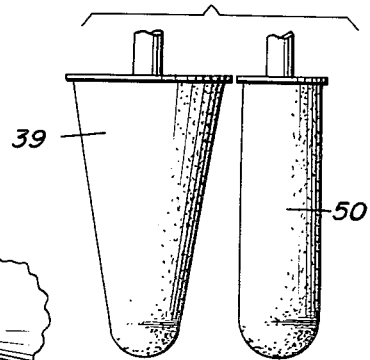
FIGURE 9 is a view in end elevation of a modified construction of the rollers of the casing applier.

Although this variable width throat has been effected by the use of conical rollers upon parallel spindles as shown in FIGURE 5, it is to be clearly understood that various other expedients may be resorted to in order to obtain such a variable throat. Thus, as shown in FIGURE 9, one of the rollers such as that shown at 39 may be conical, while the other roller as shown at 50 may be cylindrical or vertical in configuration. It is merely essential for the purpose of this invention that the throat shall be of varying widths and shall be progressively increased in width from the closed or upper end thereof to the open or bottom thereof to thereby to thereby enable the device to be caused to press against the opposite sides of the horn and the casing thereon to frictionally embrace the latter, regardless of variations in the diameters of the horn and casing.

There is also provided in order to render the use of the device more effective a guard shield mounted upon that end of the motor casing which carries the rollers. Thus, as shown in FIGURE 1, the guard shield designated generally by the numeral 52 is secured to what may be termed the front end of the motor casing 30 and extends about a major portion of the sides of the two rollers.

As shown in particular in FIGURE 4 it will be observed that the guard shield 52 is of thin sheet metal construction consisting of a main or body portion 54 having an upwardly projecting circular portion 56 which is apertured as at 58 for the reception of fastening screws 60, see FIGURES 1 and 3, whereby the shield is mounted upon the motor casing and depends therefrom. The dependent portion of the casing is provided with two arcuately extending wings 62 which extend about the sides of the rollers and are provided with convergent portions as at 64 having apertured ears 66, the apertures being shown at 68. As will be further observed from FIGURE 4, the front of the guard shield is provided with a notch 70 extending upwardly from the lower edge thereof in a position to permit passage of the casing 20 and of the horn 18 therebetween as suggested in FIGURES 1 and 3, while the apertured ears 66 are likewise cut away at their lower sides and receive therethrough a bolt or the like as at 72 by which the ears are clamped to the opposite sides of a pair of supporting lugs 74, see FIGURE 2, upon the underside of the motor casing 30. Thus the guard shield surrounds both sides and the front of the pair of rollers and a portion of the rear side thereof whereby water, liquids or solid matter sprayed or thrown from the rollers during the operation will be prevented from being ejected by the operation of the rollers from the immediate vicinity of the horn. This arrangement serves both to protect workers and adjacent equipment from being soiled by the operation of the machine as well as to minimize the accumulation of foreign matter upon the apparatus thereby reducing subsequent care and cleaning necessary after the stuffing operation has been completed.

In order to facilitate the economy of motion and labor in the use of the device, a novel mounting construction for the same and a novel control means for the device is provided. Thus there is provided a suitable support means which is here generally illustrated as consisting of a standard 80 of any desired character having an overhanging arm 82. Depending from this arm is a tension coil spring 84 which supports by means of an eye 86 a support arm or handle 88 secured to the upper portion of the motor casing 30 about which the entire device is thus resiliently mounted. Preferably the standard 80 is so positioned that the device is disposed immediately above or adjacent to the horn 18 which is to be served thereby so that when the device is pulled downwardly against the tension of the return spring 84 as to the dotted line position shown in FIGURE 1, the rollers may be lowered upon and embrace the horn 18. By releasing the downward pressure, the spring will properly lift the device out of the way into its inoperative position in readiness for the next operation. It will be understood that instead of the stand 80, that the spring 84 may be secured to some other support means as a ceiling or the like, or to a supporting cable as shown in the prior patent of Tipper, No. 2,604,657 to thereby render the position of the device with respect to a given stuffing machine or machines readily adjustable.

There is also provided a combined positioning handle and control trigger or lever for the device which is indicated by the numeral 90. This lever is pivotally mounted upon the previously mentioned bolt 72 and has a rearwardly projecting curved hand-grip 92. The hand-grip is so disposed that it may be quickly grasped by the operator and with a downward pull will lower the device and position it in its operative position.

The other end of the handle 90 is connected to the motor switch as shown in dotted lines at 91 in FIGURE 1 in a manner of any conventional type and not shown so that when the lever or handle is rotated in a clockwise direction upon its pivot which consists of the fastening bolt 72, the motor will be energized. The handle is spring-returned by a means not shown in a counter-clockwise direction whereby to cut off the operation of the electric motor when the handle is released.

As so far described it will thus be understood that in a single operation the operator with one hand will grasp the hand-grip 92, pull the device downwardly from the full line position of FIGURE 1 to its dotted line operative position with the rollers embracing the horn 18 and the casing applied thereto as shown in FIGURE 7. This downward thrust will not only position the device in operative position upon the casing for drawing the same upon the horn but will also place the rollers into operation so that the drawing operation will proceed until such time as the operator releases the hand-grip 92. Thereupon the lever 90 will disengage the switch stopping operation of the motor and the spring 84 will lift the device to its normal inoperative position.

As previously mentioned, the use of this device serves the joint functions of flushing a casing and simultaneously applying the casing upon the horn. Referring now to FIGURES 6–8, the successive steps in this operation will be now readily apparent. As shown in FIGURE 6, what may be termed the forward end 94 of the casing 20 is manually opened and a small quantity of a flushing liquid such as water is applied thereto as from a container 96. It will be understood that the quantity of liquid required for this purpose is relatively small as for example about a half a cup. With this quantity of liquid introduced into the end 94, this end 94 is then placed upon the extremity of the horn 18, with the introduced cleaning or flushing liquid indicated by the numeral 98 in FIGURE 7 being disposed in that part of the casing which is immediately adjacent to the extremity of the horn. In this position, the device is now lowered and applied to that portion of the casing which is upon the horn and the resultant rotation of the rollers will now by a smooth, uninterrupted and continuous engagement with opposite sides of the casing apply equal forces thereto which will draw the casing axially of the horn and upon the same with numeral 100 designating that portion of the casing which is slid back upon the horn. As the rollers continue to rotate, the movement of the casing upon the horn causes the mass or body of introduced flushing liquid 98 to move progressively along the casing thereby expanding and stretching the same, cleansing the interior of the casing and testing the casing against possible breaks or leaks. Obviously, if the casing should have a break or leak therein, the slight pressure applied to the liquid 98 during this operation will cause the same to spurt from this opening thereby warning the operator that the casing is defective.

Assuming that the casing is satisfactory, liquid will progressively move through the entire length of the casing and, as suggested in FIGURE 8, be discharged from the open extremity 22 thereof when all the casing has been applied upon the horn. The operator preferably grasps the rear end 22 of the casing and stops the casing with a small portion of the same projecting beyond the end of the horn as shown in FIGURE 8 and thereupon the casing applier is released and moves to its inoperative position as previously specified. In this position, with the operator holding the end of the casing closed, the valve handle 16 of the casing stuffer 12 is then operated and the meat product is discharged from the horn into the temporarily closed end of the casing thereby filling and stuffing the casing and withdrawing the casing from the horn. It will be observed that the casing is withdrawn from the horn only as the same is filled, in accordance with the conventional operation of a casing stuffing machine.

This apparatus is highly portable since it weighs in the neighborhood of about seven pounds, whereas casing stuffing machines weigh about 65 pounds and are usually stationarily mounted. A single apparatus may therefore be resiliently supported and mounted so as to serve two or more stuffing machines as desired.

The use of this apparatus obviates the necessity for preflushing the casing by hand in the usual manner thus dispensing with the labor of one employee for this operation. Further, it saves water in flushing since instead of the water being required to fill the entire volume of the casing, no more than a cupful is required which is caused to progress along the entire length of the casing as the latter is drawn upon the horn. Since the worker is in no way required to lift or support the weight of the apparatus, but merely with one hand and in one motion pulls the apparatus down and places it in operation when a service is required, the labor of the worker is reduced to an absolute minimum and thereby his efficiency is greatly increased. It has been found that with this machine a team of five men normally employed to apply the casing to the horn, operate the stuffing machine and perform the necessary twists throughout the length of the casing to form individual sausages therein has been reduced from four hours to stuff 3500 pounds of sausage to three hours. In another operational set-up a crew of one man and three women workers in a 8-hour run satisfactorily stuffed 4800 pounds of pork sausage by conventional methods whereas in accordance with this invention they were able to stuff the same amount of sausage in about one-half of the time.

Whereas there is a continuing difficulty in the conventional practice of applying the casings evenly and smoothly to the horn of the machine, the present invention by its uniform balanced force applies to opposite sides of the casing quickly and easily applies the casing to the horn with a minimum strain upon the casing and a minimum breakage or damage to the same.

By properly positioning the support means, the apparatus of this invention may be used with equal efficiency by either right handed or left handed persons.

Although the exterior casing gripping surfaces of the rollers are illustrated as being of a smooth or unbroken configuration, the invention particularly comprehends in its scope the provision of grooves or ribs or projections either horizontally or vertically thereon to increase the gripping action on wet casings.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is:

1. A portable, power operated casing applier for casing stuffing machines of the type having a stuffing horn with which material is formed into a casing and comprising a motor, a pair of rollers mounted upon and driven by said motor for rotation about vertically extending stationary axes disposed in spaced side by side relation, said rollers having their adjacent surfaces spaced from each other a sufficient distance to frictionally engage a stuffing casing when placed upon the horn of a casing stuffing machine and move said casing onto said horn and longitudinally upon the latter.

2. The combination of claim 1 wherein the space between said adjacent surfaces progressively varies in width whereby various diameters of horns may be frictionally engaged between said rollers.

3. The combination of claim 1 wherein the adjacent surfaces of said rollers are divergent from the end of the rollers adjacent said motor to the other end of said rollers whereby to provide a space between the rollers of varying width for frictionally gripping horns of different diameters between said rollers.

4. The combination of claim 1 wherein at least one of said rollers is conical.

5. The combination of claim 1 wherein both of said rollers are conical.

6. The combination of claim 1 wherein at least one of said rollers is of a resiliently deformable material.

7. The combination of claim 1 wherein both of said rollers are driven by said motor at the same speed whereby to exert a balanced, equal pull to approximately diametrically opposite sides of a casing for drawing it smoothly upon the horn.

8. The combination of claim 1 including a guard shield mounted upon said motor and extending laterally therefrom and overlying and disposed adjacent to said rollers for restricting the spraying of liquids and solid matter from said rollers.

9. A portable, power operated casing applier for casing stuffing machines of the type having a stuffing horn with which material is forced into a casing and comprising a motor, a pair of rollers disposed in spaced side by side relation for rotation about stationary axes and mounted upon and driven by said motor, said rollers being of resilient material and spaced to frictionally embrace the opposite sides of the horn of a stuffing machine for drawing a casing thereon, said rollers projecting from said motor and having their ends remote from the motor free and with the space therebetween being open, the rollers having relatively inclined adjacent surfaces which are divergent towards their free ends whereby to enable the rollers upon movement of the motor axially of the rollers to endwise engage and embrace therebetween the horn of a stuffing machine, a resilient support normally holding the motor above a horn and permitting the applier to be drawn down upon the horn.

10. The combination of claim 9 including a combined trigger and handle on said motor mounted thereon whereby when the applier is lowered upon the horn by pulling upon the handle the motor will be energized and revolve said rollers.

11. The combination of claim 9 including a guard shield mounted upon said motor and extending laterally therefrom and overlying and adjacent said rollers for restricting the spraying of liquids and solid matter from said rollers.

References Cited in the file of this patent

UNITED STATES PATENTS

| | | |
|---|---|---|
| 577,586 | Schonland | Feb. 23, 1897 |
| 1,222,318 | Miller | Apr. 10, 1917 |
| 1,302,194 | Mayer | Apr. 29, 1919 |
| 2,604,657 | Tipper | July 29, 1952 |